INVENTORS
WALTER P. BERRYMAN
ALI A. SHUMSHERUDDIN
BY
Watson, Cole, Grindle & Watson
ATTORNEYS

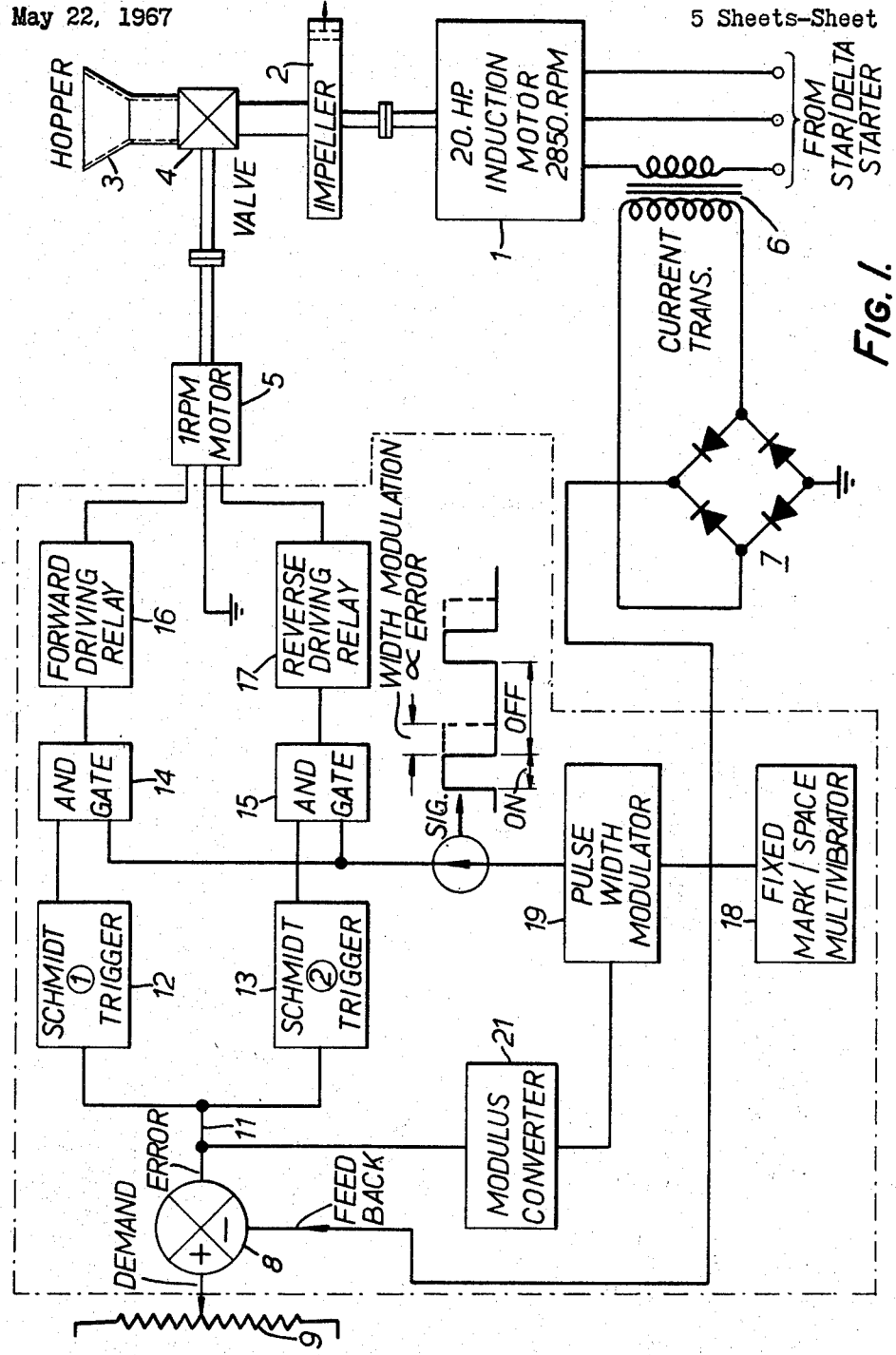

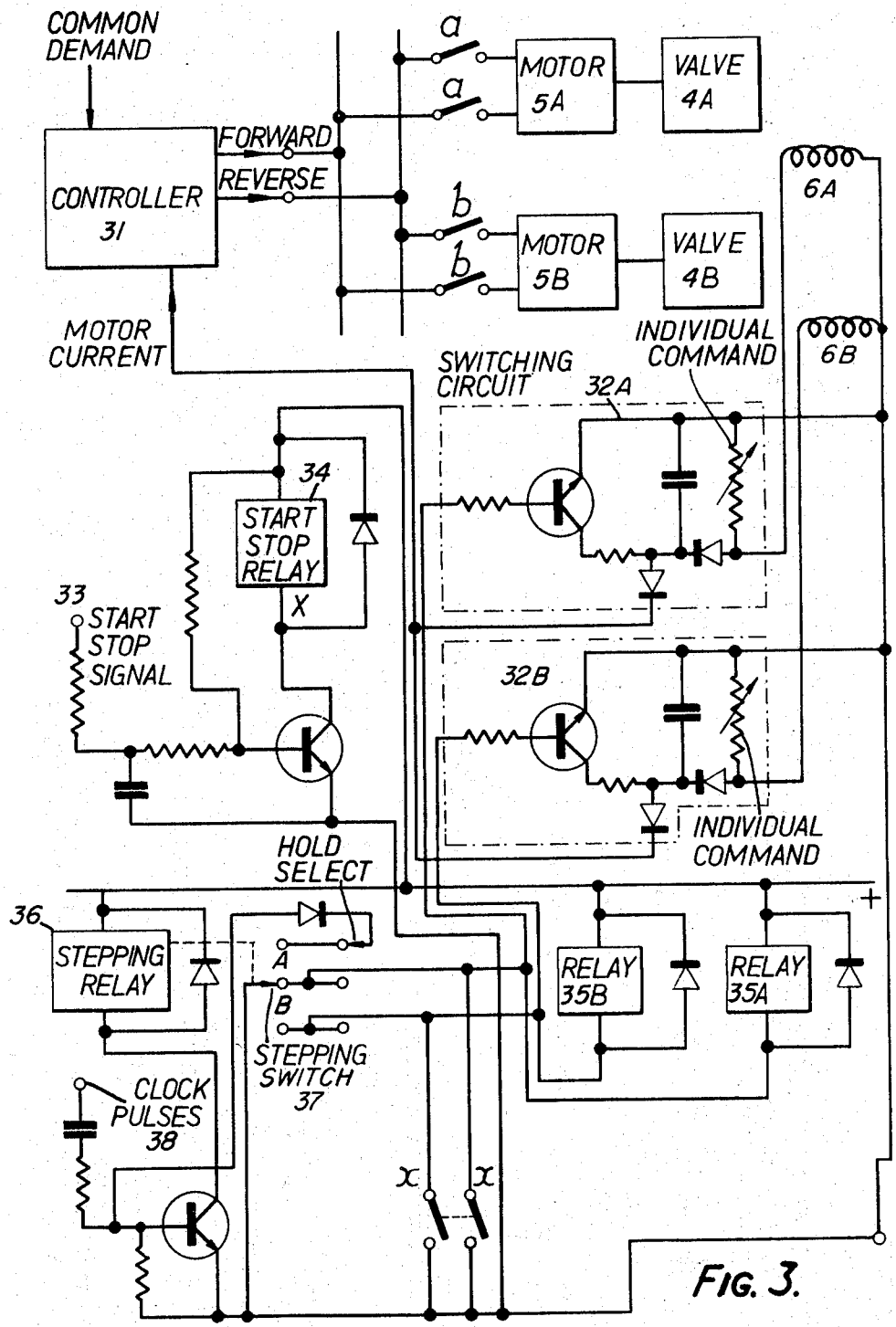

United States Patent Office 3,529,383
Patented Sept. 22, 1970

3,529,383
SHOT BLASTING ON/OFF SERVO CONTROL SYSTEM
Walter Pascoe Berryman, Bedford, and Ali Anser Shumsheruddin, Glenfield, Leicester, England, assignors to Tilghman Wheelabrator Limited, Broadheath, Altrincham, Cheshire, England
Filed May 22, 1967, Ser. No. 640,141
Claims priority, application Great Britain, May 20, 1966, 22,586/66; Feb. 21, 1967, 8,118/67
Int. Cl. B24c 3/00
U.S. Cl. 51—9                   8 Claims

ABSTRACT OF THE DISCLOSURE

This invention is a central system for controlling equipment such as a shot blaster in which there is some delay between initiation of a control and the result of the control in the operation of the equipment. The control signals are gated by a square-wave error signal in which control is applied during the marks while the spaces provide intervals for the control to take effect. The mark to space ratio can be varied in accordance with the magnitude of the error signal. Also a feature of the invention is an arrangement for using a single controller in a multiplex system for controlling two or more shot blasters in control cycles.

---

Figure 2A:
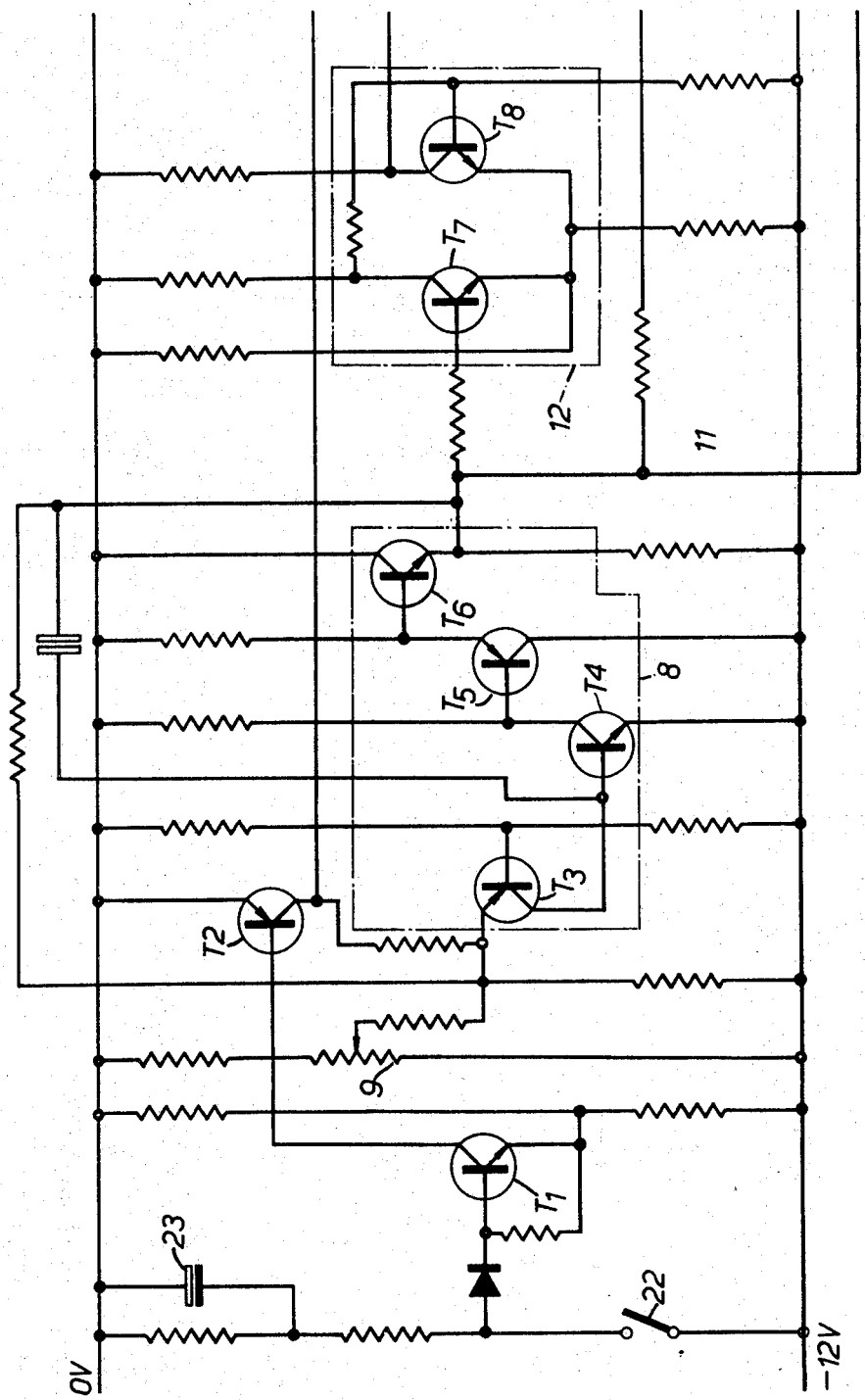

This invention relates to a servo control system for controlling shot blaster equipment operating in a bang-bang manner, that is to say operating by switching a control on or off in dependence on the presence of an error signal and not by an amount proportional to the magnitude of the error signal. The invention has particular application to a system in which response to control may have a time lag before the error signal is removed so that there is a danger of over control and hunting.

According to the present invention a servo control system for performing a control operation in one or more discrete steps in response to an error signal has means for gating the error signal by a square wave signal or the equivalent each mark of which enables one control step to be effected.

The spaces between successive marks allow a time interval for the control to take effect so that if one step has been sufficient to eliminate the error, the next mark will occur when there is no error signal and no further control will be applied.

Conveniently control is applied only in response to an error signal in excess of a datum value and the control could be in either sense depending upon the sense of the error signal.

Preferably the amount of control applied in one of the discrete steps is of the same order as the amount of control corresponding to the datum error signal level.

In a preferred form of the invention the square wave signal can have its mark to space ratio varied in dependence on the magnitude of the error signal. Thus with a large error signal the marks can be prolonged so that control will be applied for longer steps, whereas a small error signal will shorten the marks.

The invention has particular application to shot blasting equipment in which shot is projected by an impeller driven by an electric motor and the shot is fed to the impeller at a rate controlled by a control valve.

It is desirable to keep the motor load and motor current constant but the load depends upon the rate of supply of shot to the impeller so that a signal representing the current of the motor can be compared with a reference signal and any error signal detected can then be used to open or close the control valve progressively in steps.

According to an aspect of the present invention, two or more shot blasting or other equipment each having its own mechanism for controlling its operation and a single control capable of receiving a signal dependent upon the operation of an equipment and of generating a control signal for a mechanism in response to any difference between the detected signal and a reference signal, and multiplexing equipment arranged to switch the controller in turn from one equipment to the next in a control cycle.

Thus a single controller, which may be the type described above can be used to control a number of shot blasters. In steel producing plants it is often necessary to use banks of shot blasters together and the task of controlling the individual shot blasters manually to maintain consistent operation is liable to be very tedious and is unpleasant and even dangerous for the operator who is continually required to go near the shot blasting zone. However, automatic control does not have to be maintained continuously and it is quite sufficient if operation of a shot blaster is monitored from time to time and accordingly, it is possible to use a single controller for monitoring the operation of a number of shot blasters in turn in a control cycle. Thus there may be a clock pulse generator for switching the controller first to receive detected signals from one shot blaster and to generate signals for controlling the corresponding valve motor and then to receive signals from a second shot blaster and to generate signals for controlling the valve motor of that shot blaster.

In a preferred form of controller, regular pulses are generated for use in operation of the controller and these pulses may also be used as the clock pulses for switching the controller from one shot blaster to the next. Conveniently, a square wave form can be used and then the leading edges of the marks can be used to effect switching from one shot blaster to the next, while the trailing edges can be used to initiate operation of the controls. This means that switching of relays or the equivalent will be at instants when their contacts are not carrying current.

Conveniently, there will be a relay for each shot blaster to connect it in its turn to the controller and there may also be a stepping relay operated by the clock and arranged to energize the motor relays in turn.

According to a preferred feature of the invention, there are automatic means for closing all the relays at starting and stopping so that the controller will control all the shot blasters at these times. It is convenient if an overriding control is provided at starting to enable a shot blaster to run up to speed as quickly as possible and also that a special braking control is used at shut down in order that this should be achieved as quickly as possible. It is sometimes advantageous if these starting and stopping controls are applied to all the shot blasters at once.

Figure 2B:
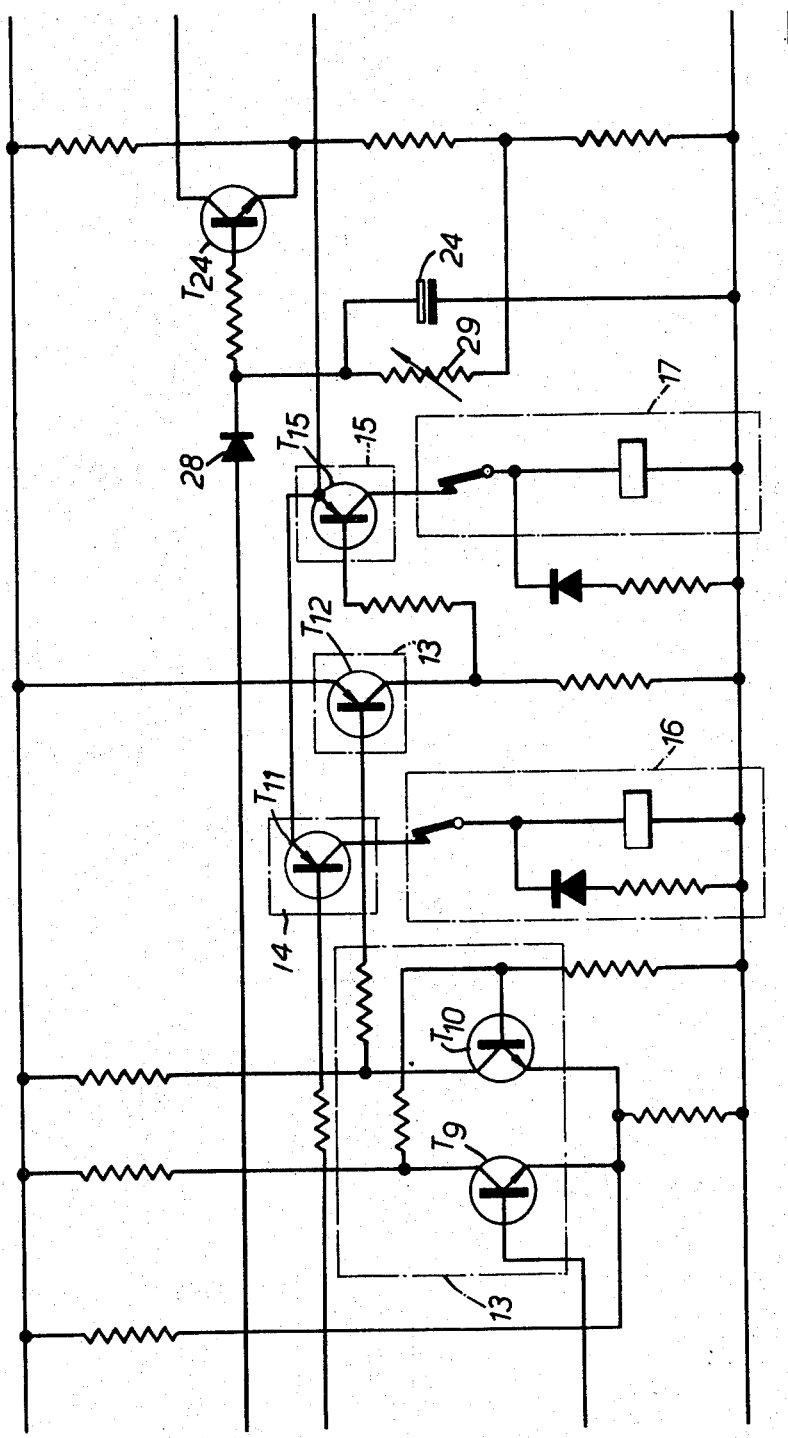
Figure 2C:
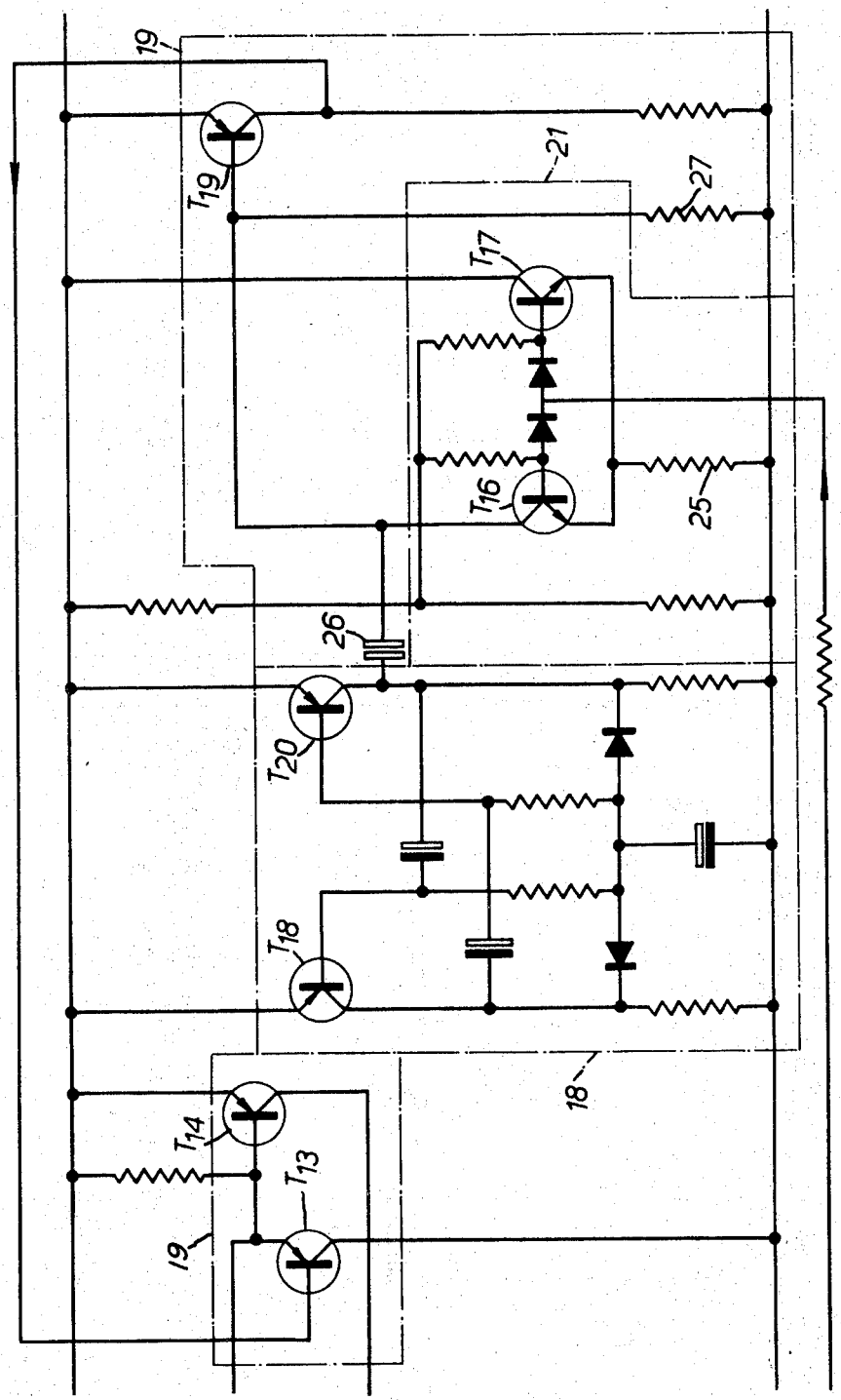

The invention may be carried into practice in various ways and one embodiment will now be described by way of example with reference to the accompanying drawings, of which:

FIG. 1 is a diagrammatic block circuit diagram of a control system for controlling a valve for supplying shot from a hopper to an impeller driven by an electric motor in shot blasting equipment, FIGS. 2A, 2B and 2C are circuit diagrams of a portion of the control circuitry, and FIG. 3 is a circuit diagram showing how the controller of FIGS. 1 and 2 can be used for two shot blasters in turn in a control cycle.

The motor is a 3 phase, 20 H.P. induction motor 1 driven from the mains at a very nearly constant speed of 2800 r.p.m., and the motor current is a direct indication of the torque reaction upon the impeller load which in turn is dependent upon the change of momentum of the shot in the impeller 2.

Thus the current depends on the rate of mass flow of shot through the impeller 2. The rate of flow of shot to the impeller from a hopper 3 is controlled by a valve 4 which can be opened or closed gradually by operation of a one r.p.m. electric motor 5.

For optimum control it is desirable to maintain the motor current at its maximum continuously rated value and for this purpose the current is detected and used to control operation of the valve operating motor 5.

Thus a current transformer 6 having its primary winding in one phase of the supply to the motor 2 has its secondary winding rectified in a bridge rectifier 7 whose D.C. output is connected to one input to a summing amplifier 8. The other input is obtained from the wiper of a potentiometer 9 which is set in accordance with the desired motor current.

The output from the amplifier 8 is a measure of the difference between the detected motor current and the set motor current and appears as an error signal at 11 for supply to "OPEN" and "CLOSE" Schmitt trigger circuits 12 and 13. If the error exceeds a permissable maximum value, for example ±2½% of full load current as set by the trigger levels of the Schmitt triggers 12 and 13, an output is supplied by way of an AND gate 14 or 15 to operate a forward or reverse driving relay 16 or 17 whose output controls operation of the motor 5 in the appropriate sense.

The second inputs to the AND gates 14 and 15 are supplied from a multivibrator 18 with a fixed mark-to-space ratio so that forward or reverse driving signals for the motor 5 can only pass during a mark of the vibrator output and no valve control is effected during the spaces. This gives time for the adjusted rate of flow of shot to reach the impeller before further control is applied and, if one step of control movement of the valve is sufficient to restore the motor current to the desired value, then the error signal will have disappeared by the time the next multivibrator mark is supplied to the AND gates 14 and 15.

In order to prevent hunting, it is arranged that the incremental movement of the valve in one step is less than the overall dead-zone between the two Schmitt trigger levels.

However, if a large change in valve setting is required it may take a long time to effect the necessary control and accordingly a pulse width modulator 19 is provided for controlling the mark-to-space ratio in accordance with the magnitude of the error signal at 11 by way of a modulus converter 21. If the error signal is small the mark-to-space ratio will also be small and there will be very small incremental movements of the valve followed by large delays corresponding to the spaces. However, for large error signals the mark-to-space ratio will be correspondingly increased.

The system just described does not hunt and can be easily adjusted for a change in shot flow, motor H.P., or r.p.m. Also the system can be designed to have high accuracy.

It is desirable to open the valve 4 quickly at starting to approximately the right extent and it is also desirable to decelerate the motor quickly on switching it off.

Accordingly, on switching the star/delta starter from star to delt a time delay circuit is connected to apply a bias which overrides the pulse width modulator 19 and holds the common input to both AND gates on for a predetermined period sufficient to open the valve rapidly and continuously to attain approximately the correct valve opening.

On switching off, the phase current falls to zero thereby demanding further opening of the shot valve. A second delay circuit allows this to continue for another predetermined period in order to apply a braking load to the impeller motor. After the elapse of this period, the reverse relay is energized continuously and the valve is returned rapidly to its shut position.

The preferred circuit is shown in FIGS. 2A, 2B and 2C which bear reference numerals corresponding to the blocks of FIG. 1.

In general it is thought that detailed description of the circuit of FIG. 2 is unnecessary but the blocks of FIG. 1 are identified on FIG. 2.

Thus the summing amplifier 8 is constituted by the circuit of the transistors T3, T4, T5 and T6 and it can be seen that the output is coupled to the two Schmitt trigger circuits 12 and 13 constituted respectively by the circuits of transistors T7 and T8 and T9, T10 and T12. The AND gates 14 and 15 operated by the Schmitt triggers 12 and 13 are constituted by the transistors T11 and T15 and it will be seen that each has one of the relays 16 and 17 connected in its collector circuit through one of the contacts of the other relay in an arrangement that ensures that only one relay can be energized at one time.

The gating signal for the gates 14 and 15 is derived from the multi-vibrator 18 of fixed mark/space ratio constituted by a circuit including the transistors T18 and T20. The output from this multi-vibrator is supplied to the pulse-width modulator 19 which is constituted by the series capacitor 26 and shunt resistor 27 forming a differentiator of the output of the multi-vibrator 18. This width modulating signal is applied through the transistors T13 and T14 to control the on time of the AND gates 14 and 15.

The modulus convertor 21 is of particular interest as providing an output proportional to the magnitude to the error signal from the summing amplifier 8 regardless of the sign.

Thus the balanced transistors T16 and T17 have a common emitter resistor 25 and an increase in the current passed by one is balanced by a decrease in the current passed by the other. If the error signal deviates from the nominal 6 volts, the current in the transistor T16 will change in the same sense—regardless of the sense of change of the error signal. The collector of this transistor T16 is connected to the junction of the series capacitor 26 and a shunt resistor 27. The effect of any deviation in the error signal is to increase the width of the marks in the multivibrator output as applied through the transistor T19 to control the AND gates 14 and 15.

The time delays mentioned above are due to the charging and discharging of the 500 mfd. capacitors 23 ond 24.

On starting, a switch 22 is open in the star position of the star/delta starter and transistor T1 is conducting and transistor T2 is thereby saturated. The output from transistor T2 through a diode 28 holds the capacitor 24 fully charged and by means of the transistor T24 overrides the pulsing of the supply to the relays. On switching to the delta position, transistor T1 and T2 are immediately cut off, but for a time dependent on the discharge time of capacitor 24 through the preset variable resistor 29, pulsing of the relay supply is delayed, thus allowing the large error signal to open the valve at full speed for a predetermined period.

On stopping, switch 22 opens, on changing from delta to star, and, after a period depending on the time to discharge the capacitor 23 sufficiently T1 starts to conduct and saturate transistor T2, which both saturates the summing amplifier in a sense to close the shot valve and rapidly charges capacitor 24 so overriding the pulsing of the relay supply which is thus held full on while the reverse driving relay 17 closes the valve.

FIG. 3 is a circuit diagram showing a single controller of the kind described with a reference to FIGS. 1, 2A, 2B and 2C for controlling two shot blasters in turn.

The shot blasters themselves are not shown, but each has shot supplied to its impeller through a control velve, indicated in the drawing as valve 4A and valve 4B, which can be open or closed by motor 5A and motor 5B in order to maintain a desired rate of operation of the shot blaster as determined by the controller in response to a signal received from a current transformer 6A or 6B responsive to the current in one phase of the motor driving the impeller.

While the invention is described as though only two shot blasters were being controlled, it is clear that as many more as are required can be controlled in a control cycle from the single controller.

It will be seen that the forward and reverse demand signals from the controller 31 are supplied to a pair of lines to which the motors 5A and 5B are connected through normally-open relay contacts a and b operated by relays 35A and 35B connected across a control circuit. A stepping switch 37 ensures that only one relay at a time is connected across the control circuit by virtue of a stepping contact which is operated by a stepping relay 36 to move from one contact to the next. Each of the contacts is connected to one side of one of the relays and the stepping contact is connected to the negative side of the control supply.

The stepping relay is operated by clock pulses which can be obtained from any desired source 38 but, in a preferred form of the invention, are received from a multivibrator included in the controller. Each pulse is applied to the base of a transistor which has the stepping relay 36 in its collector circuit so that each pulse causes the stepping contact to move from one of the six contacts to the next and connect the next relay in the circuit. The frequency of the clock pulses will be chosen to give a long enough interval between pulses for the controller to monitor, and if necessary control, the motor in the shot blasting equipment being monitored.

The signals from the various current transformers 6A, 6B are supplied through individual switching circuits 32A, 32B each containing a capacitor across which the current transformer signal is connected through a rectifier and a transistor whose emitter collector circuit is connected in series with a resistor across the capacitor. The base of the transistor is connected through a resistor with the negative side of the relay 35A or 35B corresponding to the particular current transformer.

In the condition shown in the drawing with the stepping contact on the fixed contact shown, the relay 35B is not energized, and in these conditions the bias on the base of the transistor in the switching circuit 32 for the relay 35B causes the transistor to effectively short circuit the capacitor so that the current transformer signal is not fed to the controller 31.

The relay 35A is however operated and its negative side is connected to the negative side of the control circuit supply so that the base of the transistor in the switching circuit 32 for the relay 35A is connected through the resistor to the negative side of the supply. In these circumstances the transistor acts as an impedance so that the smoothed signal from current transformer 6A appearing across the capacitor in the switching circuit can be connected through an isolating diode to the input of the controller.

In these circumstances the controller operates to compare the motor current signal with the demand signal and, if necessary, to provide a forward or reverse control signal to the motor 5A because the contacts a will be closed.

At the next mark of the clock pulses the stepping relay 36 will operate and the contact will step to the fixed contact B and the relay 35B will be energized while the relay 35A will be de-energized. The switching circuit 32B will then be ready to provide a motor current signal to the controller, whereas the output from the switching circuit 32A will be short circuited. Also the relay contacts b will connect the motor 5B to the output of the controller instead of the motor 5A.

Thus the shot blaster motors can be monitored in turn in a control cycle and as many shot blasters as are required can be connected into the cycle. It is sufficient if the monitoring period for each shot blaster in a cycle is of the order of a few seconds.

In the controller described with reference to FIGS. 1, 2A, 2B and 2C an overriding signal is provided at starting causing the controller to order full forward control so that the valve will be opened as quickly as possible, and the starting time will be reduced to a minimum. Also in that circuit, at stopping a full forward signal is applied to load the impeller to its maximum extent to provide a braking force for rapid slowing down of the impeller.

It is clearly desirable that these starting and stopping controls should be applied to all shot blasters in the cycle at once when the bank of shot blasters is switched on or switched off.

For this purpose a start or stop signal obtained at 33 from the controller when the overriding control is in operation is applied to the control circuit of a start/stop relay 34, whose contacts x are arranged when the relay is operated, to connect all of the relays 35A, 35B . . . etc. across the control circuit supply. The start/stop relay 34 is normally held off by the bias on the base of a transistor in whose emitter collector circuit it is connected, but when a start or stop signal is received and the transistor is switched on the relay 34 operates. In the input circuit shown there is a series resistor and shunt capacitor acting as a time delay circuit to prevent signals of short duration from triggering the transistor on. The start/stop signals are derived from a point in the controller where the voltage fluctuates relatively rapidly during normal operation but is maintained at an operative value during starting and stopping.

It follows that the overriding start and stop control is provided for all the motors together and in these circumstances the individual motor currents from the switching circuits have no effect on the controller.

Each motor may have its individual mechanical limit switch for disconnecting the forward control signal from its motor once the valve has opened to a predetermined safe position.

What we claim as our invention and desire to secure by Letters Patent is:

1. Shot-blasting apparatus comprising; means for projecting shot,
   means for feeding shot to said means for projecting shot,
   means for controlling said means for feeding in two or more steps to vary the rate of feeding shot,
   said means for controlling including means for generating an error signal related to the rate of projecting the shot,
   means for generating a square-wave signal, means for gating said error signal in response to said square-wave signal to initiate said control steps, said square-wave signal having a nominal mark-to-space radio, said control step initiation taking place at each mark of said square-wave signal and said space of said square-wave signal providing a time interval for said control step to be effected, and means for varying said mark-to-space ratio in accordance with the magnitude of said error signal.

2. Shot-blasting apparatus as in claim 1 wherein said means for gating said error signal initiates said control step only in response to an error signal in excess of a datum value and wherein said means for varying said mark-to-space ratio varies said ratio so that the amount of control applied in a discrete step is of the same order as the amount of control corresponding to said datum value.

3. Shot-blasting apparatus as in claim 1 wherein said means for projecting shot is driven by an electric motor and said means for generating an error signal compares a reference signal and a signal representing the current in the electric motor.

4. Shot-blasting apparatus, comprising;
   a plurality of individual shot-blaster apparatus each including means for projecting shot and means for feeding shot to said means for projecting shot, each of said shot-blaster apparatus further including means for controlling the rate of feeding shot, control means responsive to a signal transmitted from any one of said shot-blaster apparatus for generating an error signal to control the operation of said means for feeding shot, said error signal being generated in response to a comparison of said signal and a reference signal, and multiplexing apparatus for switching said control means successively to communicate with individual ones of said shot-blaster apparatus.

5. Shot-blasting apparatus as in claim 4 wherein said control means includes means for generating a signal of square-wave form, said multiplexing apparatus uses the leading edges of the square-wave signal to effect switching from one apparatus to the next, and the trailing edges of said square-wave signal initiate the control operation of said means for feeding shot.

6. Shot-blasting apparatus as in claim 4 wherein each individual shot-blaster apparatus further comprises a relay for connecting its respective shot-blaster to said control means, and said multiplexing apparatus includes a stepping relay operated by said square-wave signals for energizing the relays in turn.

7. Shot-blasting apparatus as claimed in claim 6 further comprising automatic means for closing all the relays at starting and stopping of the control of said means for feeding shot.

8. Shot-blasting apparatus as claimed in claim 7 further comprising an overriding control for use at starting to enable said means for feeding shot to run up to speed quickly and a braking control for enabling said means for projecting shot to be slowed down quickly.

References Cited

UNITED STATES PATENTS

| | | | |
|---|---|---|---|
| 3,453,781 | 7/1969 | Greenman | 51—8 |
| 3,044,227 | 7/1962 | Charunt | 51—263 |

HAROLD D. WHITEHEAD, Primary Examiner